Figure 1:
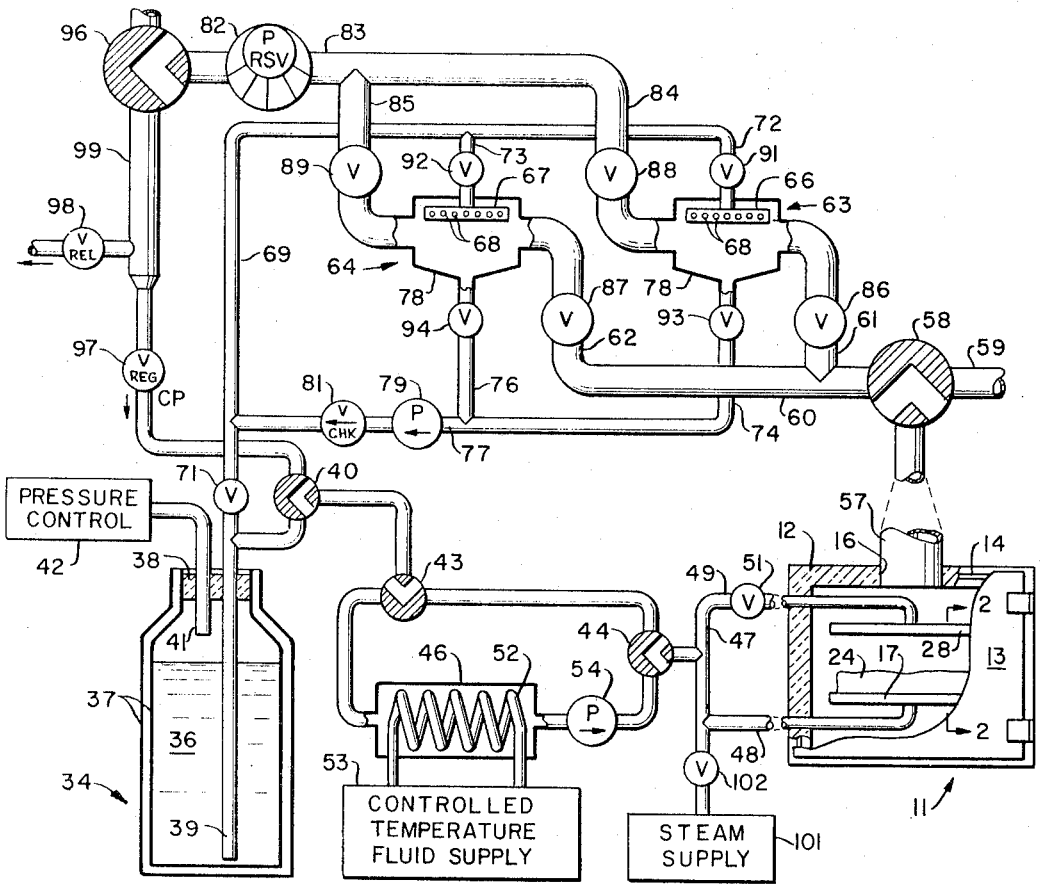

Feb. 21, 1967 M. R. JEPPSON 3,304,617
METHOD AND APPARATUS FOR FREEZE-DRYING FOODS
Original Filed June 11, 1962

INVENTOR:
MORRIS R. JEPPSON
BY: Carl C. Batz
ATTORNEY

United States Patent Office 3,304,617
Patented Feb. 21, 1967

3,304,617
METHOD AND APPARATUS FOR
FREEZE-DRYING FOODS
Morris R. Jeppson, Danville, Calif., assignor to Cryodry
Corporation, San Ramon, Calif., a corporation of California
Continuation of application Ser. No. 201,609, June 11,
1962, now Patent No. 3,222,796, dated Dec. 14, 1965.
This application Oct. 20, 1965, Ser. No. 498,499
6 Claims. (Cl. 34—5)

This application is a continuation of application Serial Number 201,609, filed June 11, 1962 now Patent No. 3,222,796.

The present invention relates to the processing of foods and more particularly to a method and apparatus providing for a more rapid and economical dehydration of foods by freeze-drying.

Although simple dehydration methods are among the oldest techniques for preserving foods against spoilage, it is only recently that satisfactory processes have been developed for the high volume production of a wide variety of commercially acceptable dehydrated foods. One of the recent basic advances in this field is the freeze-drying process.

Essentially, conventional freeze-drying is accomplished by refrigerating the product so that virtually all constituent water is formed into minute ice crystals which are distributed throughout the body of the product. The frozen product is then maintained in a vacuum for a period of several hours and under appropriate temperature and pressure conditions the ice crystals sublime, rather than melt, and the resulting water vapor is withdrawn. Upon removal from the vacuum chamber, the product is dry, porous and of greatly reduced weight.

The advantages of freeze-drying as a technique for food processing are considerable. The product may be stored at room temperature for periods ranging up to several years without significant deterioration. Owing to the porous character of the product, it is easily reconstituted, by soaking or boiling for several minutes, to a condition which is barely distinguishable from the fresh food. In addition to this basic advantage, the reduced weight and adaptability to simple packaging simplifies both shipping and storages of freeze dried products.

A drawback to free-drying as heretofore practiced is the relatively high cost of the product. With a few exceptions, most freeze-dried products have not heretofore been competitively priced with the same product as processed by more conventional means. Consequently the usage of freeze-dried foods has tended to be limited to special situations, such as the feeding of military personnel in the field, where convenience outweighs the added expense.

One prominent factor in the high cost of dehydrating foods by freeze-drying is the capital investment needed for vacuum and refrigeration equipment of adequate capacity. The use of vacuum equipment in particular causes extremely high plant costs as the necessary pumps are expensive and costly to operate. In addition, conducting the process in a vacuum environment requires that much of the equipment be constructed to withstand high pressure differentials and that numerous complex seals and hermetic closures be employed. An indirect consequence of the vacuum system has been that freeze-drying could not be economically performed as a continuous process as products cannot be continually fed into a vacuum system and removed therefrom without an inordinately complex arrangement of airlocks.

A second basic factor in the high cost of freeze-dried products results from the physical nature of the drying process itself. In particular, the sublimation of the ice crystals in the product tends to produce still further cooling thereof which, if not counteracted, would progressively lower the rate at which further sublimation takes place. Natural heat transfer to the product is very low owing to the vacuum environment, and also to characteristics of the partially dried product which will be hereinafter discussed, and thus heat must be supplied to avoid impractically long processing times. Such heating must be carefully controlled to avoid melting the ice and to avoid any scorching or partial cooking of the product. The difficulties associated with supplying heat to the product, using prior techniques, are such that processing times have typically been from eight to twenty-four hours depending on product size, consistency and water content.

In addition to the savings to be effected by reducing the vacuum requirements, the cost of freeze-dried foods may also be reduced considerably by decreasing processing time through a more efficient heating technique.

The principal means heretofore used for imparting heat to the product during freeze-drying are the use of dielectric heating, the use of infra-red irradiation, and the clamping of the product between water heated plates. Dielectric heating, while potentially very promising, has not yet been used on an extensive scale owing to presently unsolved technical problems such as a tendency to overheat the product at localized areas and difficulties with ionization and sparking within the vacuum chamber. Both infra-red heating and the heated plate technique are widely employed but are subject to a common problem which undesirably prolongs the processing time.

The drawbacks of surface heating techniques, such as infra-red irradiation or the application of heated metal plates, are best understood by considering the changes which occur within the product in the course of freeze-drying. Initially the ice crystals adjacent the surface of the product will sublime leaving the surface layer dry and porous. The sublimation causes the product to cool further so that the rate of sublimation and the diffusion of water vapor to the surface decreases as the ice phase recedes inwardly. The heated plates, or infra-red radiation, are then brought to bear on the surface of the product to accelerate the sublimation rate. The dry porous surface layer of the product however is an excellent heat insulator so that the transfer of heat to the interior ice is not only poor but becomes increasingly worse as freeze-drying proceeds. These conditions give rise to an undesirably high thermal gradient inwardly from the surface of the product with the result that the amount of heat which is applied must be severely restricted to avoid scorching the surface.

In addition to the low rate at which heat may be applied to the product, in the case of heated plates, the escape of water vapor tends to be restricted thereby causing a pressure buildup which may cause localized regions of the product to cross over the triple point with consequent melting of ice crystals.

The net effect of the foregoing problems is that freeze-dried products, prepared by present methods, are not generally economically competitive with foods processed by other means.

The present invention provides for a simpler and more economical plant, eliminates the need for conducting freeze-drying within a high vacuum system, and provides for a much more efficient heat transfer to the interior of the product during freeze-drying with a consequent reduction in processing time.

A basic feature of the invention is the use of a cryogenic gas system for initially freezing the product, for imparting heat thereto in the course of drying, and for withdrawing water vapor which is released as ice within the product sublimes.

The product is placed within a drying cabinet on a gas manifold which has a large number of perforated hollow needles that penetrates into the product. The manifold, and thus the injection needles, is connected with a supply adapted to deliver gas at an adjustable temperature. In a preferred form the supply is a dewar of liquid cryogenic gas, liquefied nitrogen being an advantageous example inasmuch as it is a readily available by-product of steel making and of liquid oxygen rocket fuel manufacture and can therefore be obtained at a relatively low cost.

The cabinet gas manifolding is connected with the supply through a first conduit which provides for the initial injection of liquid gas, or very cold vapor, directly into the product to effect rapid freezing thereof. Following freezing, the constituent water in the product is present in the form of minute ice crystals which, under appropriate temperature and pressure conditions, will convert directly to water vapor without passing through an intermediate liquid phase.

In contrast to the prior practice, evacuation of the drying cabinet is unnecessary for establishing pressure conditions under which sublimation will occur. What is required is that the partial pressure of water vapor in the cabinet be reduced to a negligible value, the presence of dry gases such as completely de-humidified air being unobjectionable. Accordingly the use of a cabinet pumping technique which primarily withdraws only water vapor allows the process to be performed at atmospheric pressure or at any other desired pressure.

Cryogenic pumping is ideally suited for this purpose and is an advantageous technique within the context of the present invention in view of the availability of liquid gas. Thus the pumping of water vapor from the product is performed by communicating the cabinet with a pumping chamber into which the liquid gas is continually sprayed, collected and recirculated. Water vapor from the cabinet is thereby condensed and deposited on the wall of the pumping chamber in the form of frost.

To counteract sublimation cooling and accelerate the drying process, heat is delivered directly to the interior of the product by injecting relatively warm gas either continuously or in periodic bursts. This is most conveniently accomplished by connecting the cabinet manifold with the gas supply through a second conduit which includes a heat exchanger.

The injection of warm dry gas directly into the product largely avoids reliance on heat conduction across dry porous surface regions thereof and thus provides much more efficient heat transfer. In addition, the gas injection promotes drying by still another effect. The injected gas diffuses through the product to the surface thereof which gas flow promotes the removal of water vapor and does not itself have any appreciable effect on the product inasmuch as it is dry and inert. The partial pressure of the water vapor in the product is not increased but is decreased owing to the purging action of the injected gas.

The foregoing technique not only effects freeze-drying in a more rapid and efficient manner but has the further advantage of employing a simpler, more reliable and more economical plant. Since the steps of refrigeration, heating and pumping may all be effected from a source of low cost liquefied gas, and drying may be done at atmospheric pressure if desired, much of the costly equipment heretofore required in a freeze-drying plant may be dispensed with.

Accordingly it is an object of this invention to provide a more efficient and economical method and apparatus for the freeze-drying of food products and the like.

It is an important object of this invention to provide for the freeze-drying of foods or the like at atmospheric pressure and at any other desired pressure.

It is an object of this invention to reduce the cost of freeze-dried products by decreasing processing time and equipment requirements.

It is another object of this invention to provide a more efficient technique for imparting heat to a product during the sublimation phase of freeze-drying.

It is another object of the invention to provide a method and apparatus for withdrawing water vapor from a product in the course of freeze-drying thereof.

It is a further object of this invention to provide an integral cryogenic gas system for freezing a food product, for withdrawing water vapor from the environment of the product to promote the sublimation of ice therein, and for heating the product in the course of such sublimation.

It is still a further object of the invention to expedite the freeze-drying of foods by the controlled injection of refrigerated and heated gas directly into the product.

Figure 2:
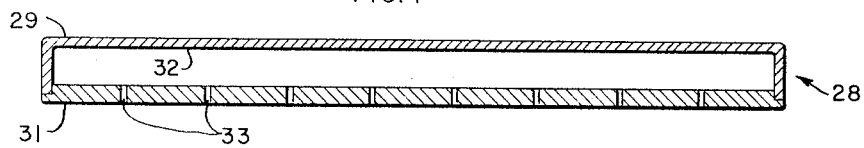
Figure 2:
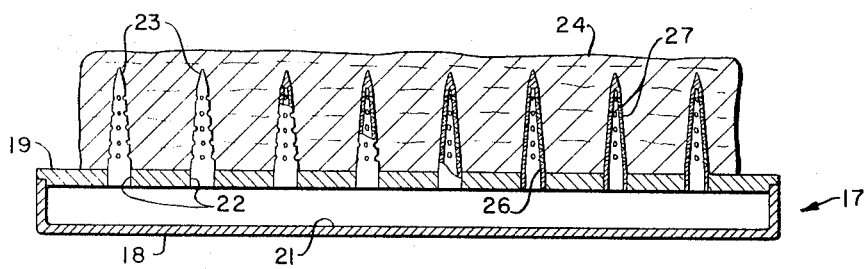

The invention, together with further objects and advantages thereof, will best be understood by reference to the accompanying drawing, of which:

FIGURE 1 is a partially broken out view of a freeze-drying chamber with associated refrigerating, heating and pumping elements shown in schematic form, and FIGURE 2 is a section view taken along line 2—2 of FIGURE 1 and showing details of the product supporting and gas injection means within the freeze-drying chamber of FIGURE 1.

Referring now to the drawing, and more particularly to FIGURE 1 thereof, there is shown a freeze-drying cabinet 11 which may be of conventional construction except as hereinafter described. Cabinet 11 is preferably formed with thick thermally insulating walls 12 and is provided with a hinged door 13 which seats against a resilient seal 14 to provide an air-tight closure. A broad port 16 is provided in the cabinet 11 for connection to vapor pumping equipment as will hereinafter be described.

Referring now to FIGURE 2 in conjunction with FIGURE 1, a flat hollow rectangular gas manifold 17 is disposed within cabinet 11, in a horizontal position therein, in this instance, for receiving the products which are to be freeze-dried. As shown in FIGURE 2 in particular, manifold 17 is provided with a dished base member 18 which is closed by a flat top plate 19 forming a chamber 21 for connection with a temperature regulated gas supply as will hereinafter be described. Top plate 19 is formed with a large number of apertures 22 which may be evenly distributed over the plate and which are closely spaced, a spacing of five-eighths inch between apertures being typical.

To provide for the injection of gas into the product, a plurality of thin hollow needles 23 are utilized, one being entered in each of the apertures 22 and projecting directly upward therefrom for a distance sufficient to extend into the overlying product 24 to a level a small distance beneath the top surface thereof. The product 24, which may be a cut of meat for example, is thus impaled on the needles 23 during processing.

Each of the needles 23 is formed with an axial passage 26 which communicates with the chamber 21 in gas manifold 17. Distributed along the length of each needle 23, and around the circumference thereof, are a plurality of minute gas emission passages 27 which connect with the axial passage 26. To avoid clogging of passages 27 when the product 24 is forced downwardly onto the needles 23, the passages 27 may be angled downwardly. To provide heat conduction into the product 24 additional to that supplied by injected gas, the needles 23 may be formed of a suitable metal such as stainless steel.

Although the product 24 may be frozen solely by injecting cryogenic gas through needles 23, freezing may be accelerated by spraying the surface of the product with additional gas. Accordingly, a hollow flat rectangular spray manifold 28 is disposed within the cabinet 11 above manifold 17 and in parallel relationship therewith. The manifold 28 is spaced above the tips of the needles 23 a distance sufficient to allow the product 24 to be easily emplaced and removed from the needles. Manifold 28 includes an inverted dished upper member 29 closed by a flat bottom plate 31 and forming a chamber 32 which is connected with the cryogenic gas supply as will be hereinafter described. The bottom plate 31 is transpierced by a plurality of narrow passages 33 which are distributed throughout the portion of the plate overlying product 24 and which serve to direct sprays of fluid against the upper surface thereof.

Considering now the heating, refrigerating and pumping elements associated with the freeze-drying cabinet 11, and with reference again to FIGURE 1 in particular, there is shown a Dewar 34 containing cryogenic (liquid) gas 36 which may be used as a medium for effecting each of the foregoing operations. As hereinbefore discussed, cost considerations make liquid nitrogen a preferred fluid however it will be apparent that other dry gases may be used.

Dewar 34 may be of conventional construction and will thus have double walls 37, a closure 38 at the top and an outlet conduit 39 which is transpierced through the closure and which extends downwardly within the Dewar to a point just above the bottom thereof. To force fluid 36 upwardly into outlet conduit 39, a second conduit 41 extends a short distance into the Dewar 34, through closure 38, and connects with a means 42 for adjusting the pressure within the Dewar. Since some heat transfer to the cold fluid 36 occurs continually, the pressure within the Dewar will constantly tend to rise. Accordingly the pressure adjusting means 42 will normally provide for venting the Dewar 34 and an elevation of the pressure, to force fluid 36 into conduit 39, may be obtained by restricting the escape of gas from the Dewar and admitting additional high pressure gas thereto, suitable mechanism for this purpose being well known to the art.

Considering now the means with which cold gas is supplied to the cabinet manifolds 17 and 28 to freeze the product 24 at the start of the process, the Dewar outlet 39 is connected with the inlet of a first three position valve 43, through a three position recirculation valve 40 which will be hereinafter discussed. Valve 43 has a first position which closes the connection with Dewar outlet 39, a second position connecting the outlet 39 to a first of two inlets of a second three position valve 44, and a third position connecting the outlet 39 with the inlet of a heat exchanger 46 for purposes to be hereinafter discussed. Valve 44 also has a closed position and a second position which connects the first inlet to a conduit 47 having two branches 48 and 49 which extend through the sidewall of cabinet 11 and connect with the manifolds 17 and 28 respectively. To stop the emission of gas through the upper manifold 28 except during the initial freezing of the product 24, a valve 51 is disposed in the branch 49 of conduit 47.

Utilizing the foregoing structure, freezing of the product 24 may be readily accomplished by setting the valves 43 and 44 at the described second positions thereof and by opening the spray manifold valve 51 for a limited period.

Following the freezing of constituent water within the product 24, and the pumping of water vapor from cabinet 11 as will hereinafter be discussed in more detail, the ice crystals within the product will sublime to form water vapor which may be withdrawn. To accelerate the sublimation, in accordance with an important feature of the invention, warmed gas from Dewar 34 is injected directly into product 24 through the previously described needles.

To supply and regulate the warmed gas, valve 43 is turned to the described third position thereof so that gas from Dewar outlet 39 is admitted to the inlet of heat exchanger 46. Exchanger 46 may include coils 52 exposed to the gas passing through the exchanger and carrying a flow of fluid, from a source 53, of adjustable temperature. Heat exchanger 46 thus serves to convert the cryogenic gas to the vapor state and to regulate the temperature thereof to a value suitable for enhancing the sublimation of ice within product 24. The outlet of the heat exchanger 46 is connected with the second inlet of valve 44 through a pump 54. Valve 44 has a third position connecting the second inlet with conduit 47 so that the warm gas is delivered to cabinet manifold 17 for injection into the product 24 as heretofore described.

In the course of the drying stage of the process, and notably in the terminal period thereof when the amount of ice in the product has been substantially diminished, it may be desirable to reduce the heat input to the product. This, as well as an increase in the heat input, may readily be effected by appropriate adjustment of the valves 43 and 44 and pump 54 or by adjustment of the heat exchanger fluid supply 53. Adjustment by means of the valves 43 and 44 and pump 54 will also affect the gas flow rate and may be used to control pressure conditions within the product 24. Adjustment by means of the heat exchanger 53 may be used when no change in the flow rate is desired.

In some instance, it may be desired that the heat input to the product 24 be less than that which can be conveniently provided by a fixed adjustment of the elements described above. It may be further desirable that gas be injected into the product 24 at high velocity but without there being a high total gas flow. Such results may be obtained by operating the described gas injection system on a pulsed basis.

The equipment and operations described above provide a basis for a still further advantageous improvement in freeze-drying technology, specifically the utilization of the cryogenic gas as an economical medium for pumping vapor from the cabinet 11. Heretofore, complex and expensive mechanical vacuum pumps or steam ejector pumps have been employed for this purpose, such elements being an important factor in the high processing costs of the prior practice. As hereinbefore discussed, it has now been found unnecessary for some products to conduct the process in a vacuum, the important requirement being that water vapor be continuously removed. The presence of thoroughly dry air or other dry gases in the environment of the product has no significant effect on ice sublimation provided the partial pressure of water vapor in the environment is maintained at a negligible value. Such water vapor is very easily and economically pumped by cryogenic techniques or, more specifically, by spraying liquid gas into a pumping chamber which communicates with the cabinet so that water vapor is condensed out in the form of frost which deposits on the walls of the chamber.

Considering now a preferred structure for the cryogenic pumping means, a broad conduit 57 extends from cabinet port 16 to the inlet of a three position valve 58. Valve 58 has a first position for closing the exhaust conduit 57, a second position connecting the conduit 57 with an outlet 59 for venting the cabinet 11, and a third position connecting the conduit 57 with a tubulation 60 which has two branches 61 and 62 coupled to the inlets of a pair of cryogenic pumping housings 63 and 64 respectively. Two of the pumping units 63 and 64 are employed in order that pumping may be continued while each unit is alternately isolated for the removal of accumulated ice.

Spray manifolds 66 and 67, each having a plurality of gas emission apertures 68, are mounted within the upper portions of the pumping housings 63 and 64 respectively. To supply liquid gas to the manifolds 66 and 67, a conduit 69 leads from the Dewar outlet conduit 39 through a control valve 71 to two branch conduits 72 and 73 which connect with the manifolds 66 and 67 respectively.

For efficient pumping, more liquid gas is sprayed into the pumping housings 63 and 64 than is theoretically required to condense the incoming water vapor flow. Accordingly the excess liquid must be continually withdrawn and preferably recirculated for maximum economy. To provide for recirculation, two branches 74 and 76 of a drain conduit 77 connect with sumps 78 formed at the bottom of the pumping housings 63 and 64 respectively. Drain conduit 77 connects with the inlet of a recirculation pump 79 which has a discharge outlet connecting with the spray supply conduit 69 through a check valve 81.

To exhaust excess gaseous nitrogen from the pumping housings and to prevent the diffusion of external moisture into cabinet 11, suitable mechanical pumps 82 may be connected with pumping housings 63 and 64 through an exhaust tubulation 83 having branches 84 and 85 connecting with outlets in housings 63 and 64 respectively. It should be understood that backing pump 82 need not be high vacuum pumps but may, if desired, be operated in such a manner as to maintain a small positive pressure within cabinet 11 in order that any gas leakage through seals or pipe joints will be in an outward direction. Pumps 82 may in fact be dispensed with where it is not desired to accurately control the pressure within cabinet.

In order to isolate either one of the pumping housings 63 and 64 so that it may be opened for the removal of accumulated ice while pumping continues in the other housing, all conduits and tubulations which connect with each housing are provided with a valve. Accordingly, valves 86 and 87 are disposed in the housing inlet tubulation branches 61 and 62 respectively, and valves 88 and 89 are disposed in the outlet branches 84 and 85 respectively. For similar purposes, valves 91 and 92 are disposed in the conduit branches 72 and 73 which supply liquid gas to housings 63 and 64 respectively and valves 93 and 94 are disposed in the housing drain conduit branches 74 and 76 respectively.

Although backing pumps 82 may exhaust to the atmosphere, it will generally be found more economical to recirculate the pump exhaust through the system. To provide for recirculation, the outlet of backing pumps 82 is connected to the inlet of a valve 96 having a first position which vents the pump exhaust and having a second position which delivers the pump exhaust to a second inlet of the previously described recirculation valve 40 through a pressure regulator 97. Valve 40 has a second position at which the regulator 97 outlet is connected with the inlet of the cabinet manifold feeding system valve 43 and at which the Dewar 34 is disconnected therefrom. Owing to the evaporation of liquid gas within pumping housings 63 and 64, more gas is exhausted from backing pumps 82 than can be recirculated into the freeze-drying cabinet 11. Accordingly, a relief valve 98 is coupled to the conduit 99 which connects valve 96 with regulator 97.

Referring now again to FIGURE 2 in conjunction with FIGURE 1, removal of the product 24 from the needles 23 following the drying stage may cause the minute gas emission passages 26 of the needles to become clogged. To provide a rapid and efficient means for clearing the passages 26, a steam source 101 is connected with the conduit 47 which carries gas to the cabinet 11, such connection being made through a control valve 102. The use of high pressure steam for clearing the needle passages has the further advantage of sterilizing the needles as is desirable where food products are being processed.

Considering now the sequence of steps employed in the operation of the above described apparatus, the product 24, after the customary preparatory processing, is impaled on the needles 23 within the cabinet 11 as heretofore described. Following closure of the cabinet door 13, valve 58 is set at the described second position thereof to vent the cabinet and the gas supply valves 43 and 44 are also set at the described second positions thereof to feed cold liquid gas from Dewar 34 to the cabinet manifolds 17 and 28. Valve 51 is opened during this initial stage of the process to feed the liquid gas to the upper spray manifold 28.

Owing to the injection of the cold gas directly into the product 24 through the needles 23 as well as the spraying of the exterior of the product with gas, constituent water is very rapidly frozen into minute ice crystals without any significant change occurring in the remainder of the product. Valves 43, 44 and 51 may then be closed to stop the flow of cold gas into the cabinet 11.

Following freezing of product 24, the pumping system is actuated by starting backing pumps 82 and recirculation pump 79, with the pumping gas supply valve 71 opened and the exhaust line valve 58 set at the third position thereof to connect the cabinet with the pumping chambers 63 and 64. To provide for the initial heavy pumping load, both chambers 63 and 64 may be operated by opening all the associated valves 86, 87, 88, 89, 91, 92, 93 and 94. As the load decreases in the later portion of the drying stage, the pumping chambers 63 and 64 may alternately be isolated by closing the associated valves to permit the removal of accumulated ice.

The injection of liquid nitrogen into the pumping chambers 63 and 64, through manifolds 68, will rapidly freeze water vapor from cabinet 11, the excess gaseous nitrogen being withdrawn by backing pumps 82. Owing to the consequent reduction of the partial pressure of water vapor within the cabinet 11, the sublimination of ice crystals within the product 24 is accelerated.

As has been discussed, the rate of sublimination will tend to progressively decrease owing to the further cooling which is inherent in the process. To maintain the sublimation at an optimum rate, the cabinet gas supply valves 43 and 44 are set at the third positions thereof. With these valve settings, gas from Dewar 34 is warmed by passage through heat exchanger 46 and is delivered by pump 54 to the cabinet manifold 17 and needles 23, the temperature of the gas being controllable by appropriate adjustment of the heat exchanger fluid supply 53. The emission of the warm gas from the passages 27 in the needles 23 efficiently delivers heat throughout the interior of the product 24 resulting in a much more rapid drying than can be effected by applying heat only to the surface of the product.

As previously described, when sufficient gas from Dewar 34 has been introduced into cabinet 11 and the pumping system, valves 40 and 96 are operated to disconnect the Dewar from valve 43 and to initiate the recirculation of exhaust gas from pumps 82.

After all ice within the product 24 has sublimed, gas supply valves 43 and 44 are closed to stop the injection of gas and the exhaust valve 58 is set at the second position thereof to vent the cabinet. The cabinet 11 may then be opened and the freeze dried product 24 removed for packaging. To unclog the gas emission passages 27 of the needles 23, in preparation for a subsequent cycle of operation, valve 102 may be momentarily opened to supply high pressure steam to the needles.

Variations in both the method and apparatus are possible within the spirit and scope of the invention. For example the shortening of drying time and the elimination of the need for a high vacuum system and attendant seals as taught by the invention make it practical to perform freeze-drying as a continuous process rather than on a batch basis as has heretofore been the practice. Where a large volume of product is to be handled, continuous processing may effect a very considerable further cost saving through a higher production rate.

Similarly, it will be apparent that the apparatus may readily be modified for the freeze-drying of liquids, such as fruit juices, by minor modifications of the gas manifold 17 within cabinet 11 to provide a fluid retaining wall around the needles 23.

In view of the many further modifications and variations which will suggest themselves to those skilled in

What is claimed is:

1. Apparatus for the freeze-drying of a solid substance, such as meat, comprising, in combination, an enclosure, a water vapor condensing means coupled to said enclosure, a gas manifold disposed within said enclosure, a plurality of hollow apertured needles mounted on said gas manifold for penetration into said substance, said needles having axial passages communicating with said manifold, and means for heating dry gas and for supplying such dry gas to said manifold at a controlled temperature whereby the temperature of said substance may be controlled in the course of freeze-drying.

2. Apparatus for the freeze-drying of a solid substance, such as meat, comprising, in combination, an enclosure, a water vapor condensing means coupled to said enclosure, a gas manifold disposed within said enclosure, said manifold being coupled to means for alternately supplying cryogenic gas and warm dry gas, a plurality of hollow apertured needles mounted on said gas manifold for penetration into said substance, said needles having axial passages communicating with said manifold, and means for heating dry gas and for supplying such dry gas to said manifold at a controlled temperature whereby the temperature of said substance may be controlled in the course of freeze-drying.

3. Apparatus for the freeze-drying of a solid substance, such as meat, comprising, in combination, an enclosure, a water vapor condensing means coupled to said enclosure, a gas manifold disposed within said enclosure, said manifold being coupled to means for alternately supplying cryogenic gas and warm dry gas and steam, a plurality of hollow apertured needles mounted on said gas manifold for penetration into said substance, said needles having axial passages communicating with said manifold, and means for heating dry gas and for supplying such dry gas to said manifold at a controlled temperature whereby the temperature of said substance may be controlled in the course of freeze-drying.

4. Apparatus for the freeze-drying of a solid substance, such as meat, comprising, in combination, an enclosure, a water vapor condensing means coupled to said enclosure, said means utilizing a spray of cryogenic gas for condensing the water vapor, a gas manifold disposed within said enclosure, a plurality of hollow apertured needles mounted on said gas manifold for penetration into said substance, said needles having axial passages communicating with said manifold, and means for heating dry gas and for supplying such dry gas to said manifold at a controlled temperature whereby the temperature of said substance may be controlled in the course of freeze-drying.

5. The apparatus of claim 4 wherein said water vapor condensing means comprises at least two housings which are alternately coupled to said enclosure and sprayed with cryogenic gas whereby the housings may be alternately cleared of accumulated ice.

6. In a method for freeze-drying a solid substance, such as meat, at atmospheric pressure the steps comprising freezing said substance, then reducing the water vapor content from the environment about said substance by employing a spray of liquid cryogenic gas to convert the vapor into ice, and drying said substance of substantially all its water content.

References Cited by the Examiner
UNITED STATES PATENTS

| | | | |
|---|---|---|---|
| 2,930,139 | 3/1960 | Brynko et al. | 34—5 |
| 3,114,248 | 12/1963 | Morrison | 62—64 |
| 3,132,929 | 5/1964 | Thuse | 34—5 X |

ROBERT A. O'LEARY, *Primary Examiner.*

W. E. WAYNER, *Assistant Examiner.*